United States Patent
Navon et al.

(10) Patent No.: US 12,093,558 B2
(45) Date of Patent: Sep. 17, 2024

(54) HOT-COLD CHUNKS SOFT-PREDICTION DURING PROGRAMMING

(71) Applicant: Western Digital Technologies, Inc., San Jose, CA (US)

(72) Inventors: Ariel Navon, Revava (IL); Idan Alrod, Herzliya (IL); David Avraham, Even Yehuda (IL); Eran Sharon, Rishon Lezion (IL); Vered Kelner, Gan Haim, IL (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/751,159

(22) Filed: May 23, 2022

(65) Prior Publication Data
US 2023/0376227 A1    Nov. 23, 2023

(51) Int. Cl.
*G06F 3/06* (2006.01)

(52) U.S. Cl.
CPC ............ *G06F 3/0653* (2013.01); *G06F 3/061* (2013.01); *G06F 3/0659* (2013.01); *G06F 3/0679* (2013.01); *G06F 2212/7202* (2013.01)

(58) Field of Classification Search
CPC ...... G06F 3/0653; G06F 3/061; G06F 3/0659; G06F 3/0679; G06F 2212/7202
See application file for complete search history.

(56) References Cited

U.S. PATENT DOCUMENTS

| | | | |
|---|---|---|---|
| 9,141,528 B2 | 9/2015 | Gorobets et al. | |
| 9,715,445 B2 | 7/2017 | Ravimohan et al. | |
| 10,403,377 B2 | 9/2019 | Achtenberg et al. | |
| 10,698,832 B2 | 6/2020 | Lo | |
| 10,977,179 B2 | 4/2021 | Lieber et al. | |
| 10,997,080 B1 | 5/2021 | Eliash et al. | |
| 2011/0145486 A1* | 6/2011 | Owa | G06F 12/0246 711/E12.008 |
| 2011/0264843 A1* | 10/2011 | Haines | G06F 3/0679 711/170 |
| 2015/0253998 A1* | 9/2015 | Park | G06F 12/0866 711/103 |
| 2017/0371559 A1 | 12/2017 | Higgins et al. | |
| 2019/0095116 A1* | 3/2019 | Igahara | G06F 3/0634 |
| 2019/0243787 A1 | 8/2019 | Mittal et al. | |
| 2019/0377494 A1* | 12/2019 | Rao | G06F 12/0246 |
| 2021/0279170 A1* | 9/2021 | Liu | G06F 12/0607 |

* cited by examiner

*Primary Examiner* — Kalpit Parikh
(74) *Attorney, Agent, or Firm* — PATTERSON + SHERIDAN, LLP (57) ABSTRACT

The present disclosure generally relates to estimating when data to be written will be read or re-written prior to actually writing the data to the memory device. The estimating can be used to smartly route the data to the appropriate memory location at the writing stage or to evict the data from a hot memory location to a colder memory location. To perform the estimating, typical traces or data may be used as may the metadata of the data. Separating data according to the data "temperature" (i.e. the expected access time and frequency), and usage to optimize the SLC partition usage has meaningful impact on several storage metrics such as performance and endurance.

8 Claims, 5 Drawing Sheets

HOT-COLD CHUNKS SOFT-PREDICTION DURING PROGRAMMING

BACKGROUND OF THE DISCLOSURE

Field of the Disclosure

Embodiments of the present disclosure generally relate to predicting a next read access at the time data is being written.

Description of the Related Art

The separation of different data chunks into different "temperatures" (i.e., hot/cold) according to the access frequency of the data is a well-known and important subject at storage management domain. An efficient separation of hot/cold data can allow improved storage management, for example by: placing hot/cold data in different blocks—as to allow a more efficient garbage collection procedures; selective folding from single level cell (SLC) to triple level cell (TLC) of the hotter data; reduced/equalized wearing out of the memory—(e.g. by placing hot data on less worn-out physical blocks); and allocating reduced protection error correction code (ECC) level to hot data to name a few.

In some systems, SLC partition is managed according to a simple first in first out (FIFO) scheme, where hot chunks are kept longer at the SLC partition. For example, temperature dependent multiple SLC pools are managed. A chunk that is accessed goes up to a hotter pool while cold chunks that are not accessed, gradually get cooler and transferred to colder pools. Eventually the chunks get evacuated to TLC partitions from the coldest pool. The disadvantage of such a method is that data that was folded recently from the coldest pool may be next read or invalidated, where reading is slower in TLC and invalidation will make the block closer to relocation process.

Therefore, a reliable cold versus hot data classification and management scheme will be useful for better flash management systems.

SUMMARY OF THE DISCLOSURE

The present disclosure generally relates to estimating when data to be written will be read or re-written prior to actually writing the data to the memory device. The estimating can be used to smartly route the data to the appropriate memory location at the writing stage or to evict the data from a hot memory location to a colder memory location. To perform the estimating, typical traces or data may be used as may the metadata of the data. Separating data according to the data "temperature" (i.e. the expected access time and frequency), and usage to optimize the SLC partition usage has meaningful impact on several storage metrics such as performance and endurance.

In one embodiment, a data storage device comprises: a memory device; and a controller coupled to the memory device, wherein the controller is configured to: receive a write command; retrieve data associated with the write command; determine a temperature for the data, wherein the temperature is an indication of how soon the data is to be re-written or read after writing; and write the data to the memory device, wherein the writing occurs after the determining.

In another embodiment, a data storage device comprises: a memory device; and a controller coupled to the memory device, wherein the controller is configured to: retrieve a temperature scores for a plurality of chunks of data stored in single level cell (SLC) memory, wherein the temperature score is created prior to writing the data to SLC; select at least one chunk of data of the plurality of chunks of data; and move the at least one chunk of data from SLC memory to multi-level cell (MLC) memory.

In another embodiment, a data storage device comprises: memory means; and a controller coupled to the memory means, wherein the controller is configured to: determine an estimate of when data will be read or re-written prior to writing the data to the memory means; write the data to a location in the memory means based upon the determining; and perform a garbage collection operation to move data within the memory means based upon the determining.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to estimating when data to be written will be read or re-written prior to actually writing the data to the memory device. The estimating can be used to smartly route the data to the appropriate memory location at the writing stage or to evict the data from a hot memory location to a colder memory location. To perform the estimating, typical traces or data may be used as may the metadata of the data. Separating data according to the data "temperature" (i.e. the expected access time and frequency), and usage to optimize the SLC partition usage has meaningful impact on several storage metrics such as performance and endurance.

Figure 1:
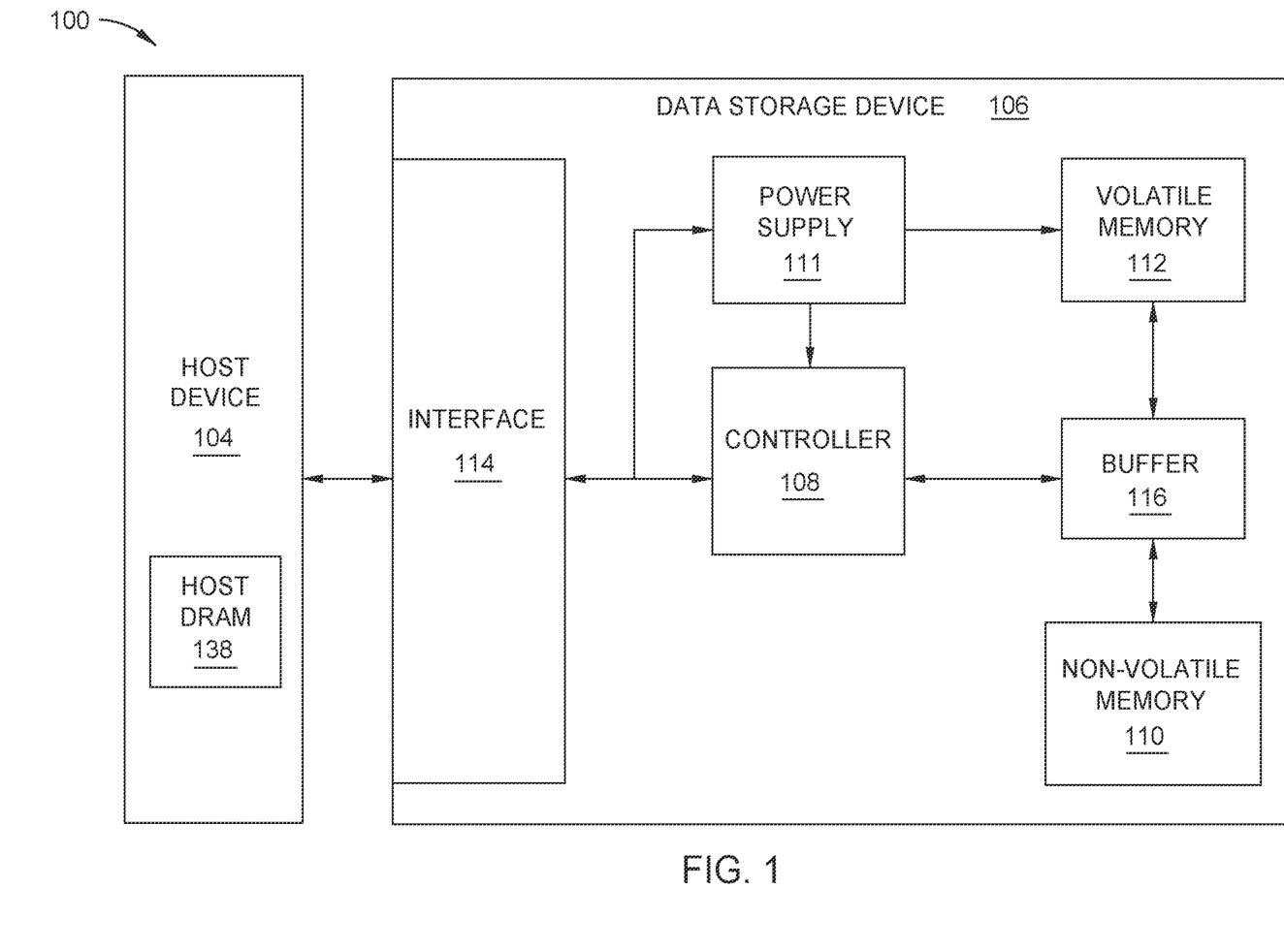
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

In typical operation, the host device 104 sends read and/or write commands to the data storage device 106. For read commands, the controller 108 retrieves the requested data from the NVM 110 and delivers the data to the host device 104. The location of where the data is stored in the NVM 110 impacts the retrieval time. For example, data stored in SLC can be retrieved faster than data stored in MLC, TLC, or QLC. Due to the different retrieval times, hotter data (i.e., data that is retrieved often) should be stored in SLC while colder data (i.e., data that is not retrieved very often) should be stored in MLC, TLC, or QLC memory to ensure efficient data retrieval. If hot data was stored in QLC while cold data was stored in SLC, the QLC would be accessed more often than the SLC and hence, data retrieval would be inefficient.

As the data is accessed, the temperature of the data becomes known. The data may be accessed for read purposes or re-write purposes such as garbage collection. The more often the data is retrieved, the hotter the data. The less often the data is accessed the colder the data. The colder data is typically moved to colder storage, such as MLC, TLC, or QLC whereas hotter data is moved to SLC if in colder storage. Knowing the temperature of the data is beneficial for data storage device efficiency.

The embodiments disclosed herein involve predicting when the next read access of each data chunk will occur or prediction of the time until the data chunk will be re-written. The predicting will occur during the current write operation of the data. Stated another way, the embodiments disclosed herein involve predicting when the data will be access prior to even writing the data to the NVM 110. The prediction will occur during the current write operation of the data and will be based on indications derived from the metadata associated with the current write command as well as previous write commands.

Specifically, the embodiments discussed herein involve a high granularity prediction that enables: prioritizing direct routing of the data to either SLC or TLC (or MLC or QLC) partitions according to the data expected time until being read; and selective prioritization of eviction from SLC to TLC (or MLC or QLC) according to the soft-prediction (i.e., high granularity) score.

The concept includes several flavors and related embodiments. However, the basic proposal includes the following steps of off-line analysis: collecting typical traces of data that are programmed to the storage device; defining several (metadata related) characteristics of the write commands ("features" discussed below); and conducting an off-line training. The training will produce a prediction model of the time-until-read, or time until re-write, of each chunk with different granularity given the specific characteristics values of each data chunk. The offline training model will be used by the operational management firmware (FW) for smart direct routing of each data chunk into intermediate storage at SLC or hybrid partitions, or to directly route the colder data into MLC (or TLC or QLC), based on the predicted "heat" score of the data. Additionally, the predicted "heat" score may be used for determining the open block into which the data will be programmed among several open blocks (e.g. an open block for hot data vs. an open block for super-hot data). Another application is to use this prediction model for selective eviction from SLC to TLC (or MLC or QLC) according to the "heat" score attached to each data chunk (e.g. a jumbo block). Both of these fundamental applications are aimed to keep the hotter data at the SLC or hybrid blocks, such that most of the read operations will be conducted from the fast and durable intermediate storage or such that the re-written data will not erode the MLC/TLC/QLC.

In order to implement the prediction, the data storage device, or more specifically the controller of the data storage device, receives a write command instructing the data storage device to write data to the memory device. The data to be written has metadata. Additionally, presuming the data storage device has already stored some data in the memory device, has a history of writing data to the memory device and retrieving data from the memory device. Each time that data is re-written within the memory device and for the initial time that the data is written to the memory device, the data storage device takes note of the writing. Additionally, each time the data is read, the data storage device takes note of the reading. Hence, for each bit of data, the data storage device tracks access to the data. Finally, the data already written to the memory device has metadata.

Generally speaking, as read commands are processed, data statistics are gathered. The data associated with those read commands (e.g., data statistics and/or metadata) is used as features to infer the heat or temperature (i.e., time until read or re-write) of a write command that is not yet written. Based upon the inference, the heat or temperature of the data associated with the write command is predicted. The prediction occurs prior to even writing the data associated with the write command. Based upon the prediction, the data associated with the write command is routed to the appropriate storage location associated with the predicted heat or temperature.

As one example, for the new data associated with the received write command, the data storage device can compare the metadata of the new data to metadata of already written data. Based upon the similarity of the metadata, the controller can route the new data to the appropriate storage location. More specifically, the more similar the metadata, the more likely that the data will be accessed at a similar frequency. Hence, for very for similar metadata, the new data will be routed to the same temperature score storage area as already stored data.

As an example, consider a situation where three chunks of data are already stored in a memory device. The first chunk of data is stored in cold storage because the first chunk of data is not accessed very often. The second chunk of data is stored in hot storage as the second chunk of data is accessed more frequently than the first data. The third chunk of data is stored in super-hot storage as the third chunk of data is accessed more frequently than the second data. Note that the cold storage, the host storage, and the super-hot storage are distinct locations. Now assume a new chunk of data is to be written. The metadata of the new chunk is compared to the metadata of the first chunk, the second chunk, and the third chunk. Whichever metadata is most similar to the metadata of the new data provides the prediction of where to store the new data. For example, if the metadata of the new data is most similar to the metadata of the second chunk, then the new data will be routed to the hot storage. Alternatively, if the metadata of the new data is most similar to the metadata of the third chunk, then the new data will be routed to the super-hot storage. Finally, if the metadata of the new data is most similar to the metadata of the first chunk then the new data will be routed to the cold storage. Hence, a metadata comparison provides a prediction of where to store new data.

It is to be noted that if, for example, chunks of data already stored are misclassified and have not yet been re-written to a new location, then it is contemplated that the new data will be routed to the location where the misclassified data should be located due to the known information regarding access of the chunks of data already stored and the metadata. The metadata of new data compared to already stored data provides a prediction of where the new data should be stored. The access information of the already stored data aids in the prediction because the access information provides more granularity in the prediction location in the case of numerous storage locations and when already stored data is misclassified and not yet moved to the correct storage location.

One manner to utilize the predicting involves predicting when the next read or write will occur during the write time for each data chunk. A typical data chunk could be either FMU, block or a jumbo-block. The "heat" score of each such data chunk could either be according to predicted time till next read, next write, or a combination of both. In other words, the comparison is based upon similar chunk size which can be a FMU, block, or jumbo-block. The prediction will occur as discussed above comparing metadata to generate a heat or temperature score for the new data. It is to be understood that the temperature score can be based upon the prediction of when the data will be accessed next for reading, re-writing (such as for garbage collection), or both.

Another manner to utilize the predicting involves using a hard/soft metric instead of the conventional binary decision to either Hot/Cold class. As such, a high granularity ("soft") heat score, e.g. according to predicted time till next read operation of current programmed data chunk, can result in a different storage location that cold data or super-hot data. In that manner a "hard" prediction can be used for one of pre-defined heat classes, or a "soft" prediction score can be used in which the score is a continuous number. The first "hard" option can be achieved by a classification prediction model, whereas the second "soft" option refers to a regression prediction model.

In the classification approach several heat level (e.g., two classes of cold/hot, or three classes of cold/hot/super-hot, etc.) are defined, and based on the calculated characters of current data chunk ("features") the controller tries to predict to which heat class the current chunk belongs. It is to be understood that the number of classes is not limited to two or three classes, but rather, can be any number of classes.

On the other hand, in the regression approach, the model predicts based upon a connection between the measured features of each data chunk to the time until the data chunk will be read or re-written. For example, each data is unique and compared to all other data for classification purposes to classify the data from coldest to hottest. The new data will is classified in a location somewhere between coldest and hottest, or even at one of the two extremes (i.e., the new data will become the hottest data or the coldest data). Based upon where the new data falls within the temperature spectrum indicates where to store the new data. Stated another way, wherever the new data falls within the spectrum, it will be stored in the same location as the data directly next to the data in the spectrum.

Another manner to utilize the predicting involves super-hot data caching. For example, whenever using three or more heat-level classes, a limited amount of RAM is allocated for caching the data marked as "super-hot" (i.e., soonest to be accessed data) by the prediction model during programming. This cache partition will store a copy of the Super-Hot data chunks, and can be placed at either SRAM/DRAM/HMB/internal Buffers. The relevant logical to physical (L2P) pointers can be stored in the cache (e.g. SRAM) as well to allow fast access of this Super-hot data. Additionally, a choice may be made regarding to which open block the current chunk will be programmed to (i.e., either a regular hot open block or to a super-hot open block) according to the heat predicted grade.

Figure 2A:
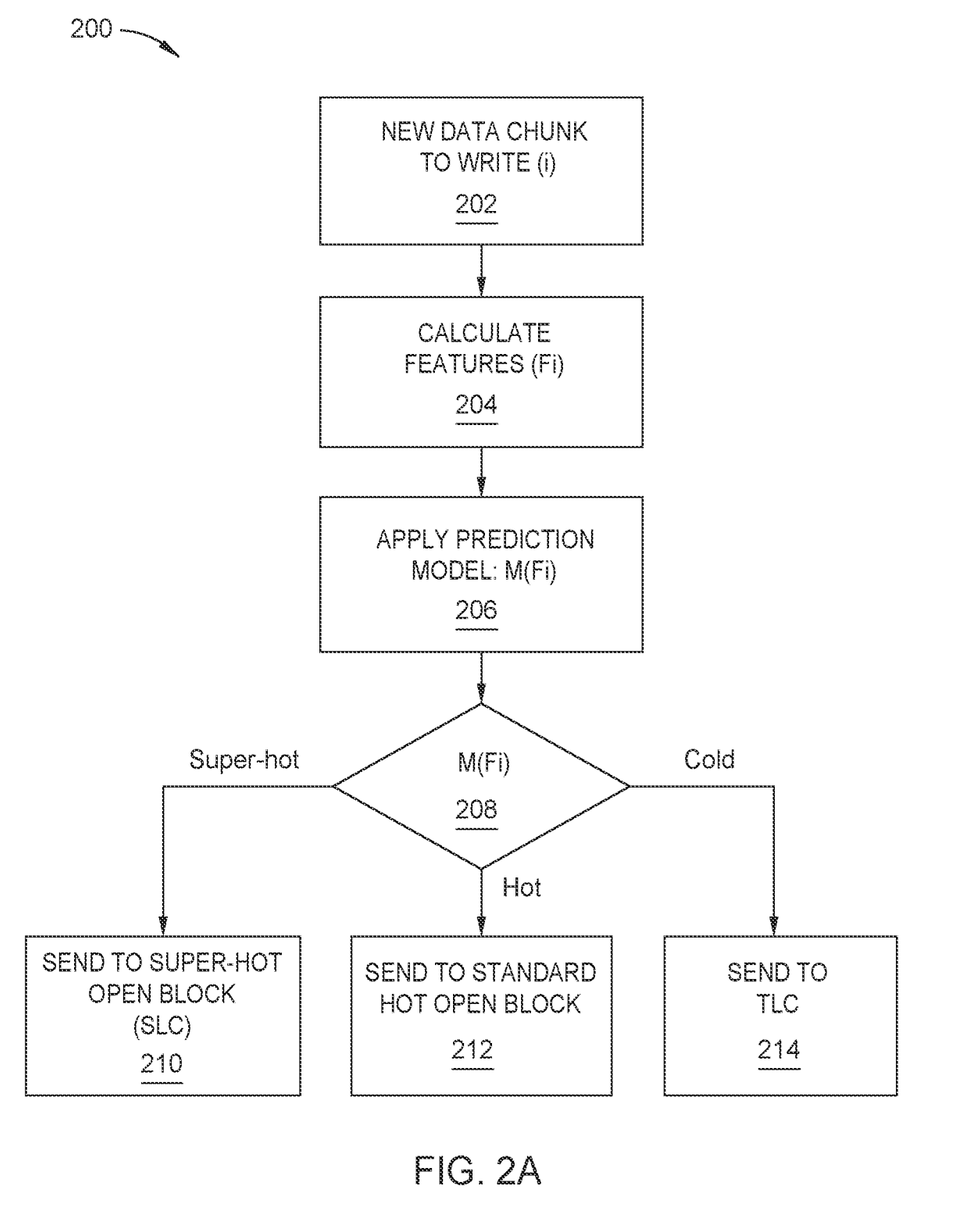
FIG. 2A is a flowchart illustrating super-hot data prediction handling according to one embodiment.
Figure 2B:
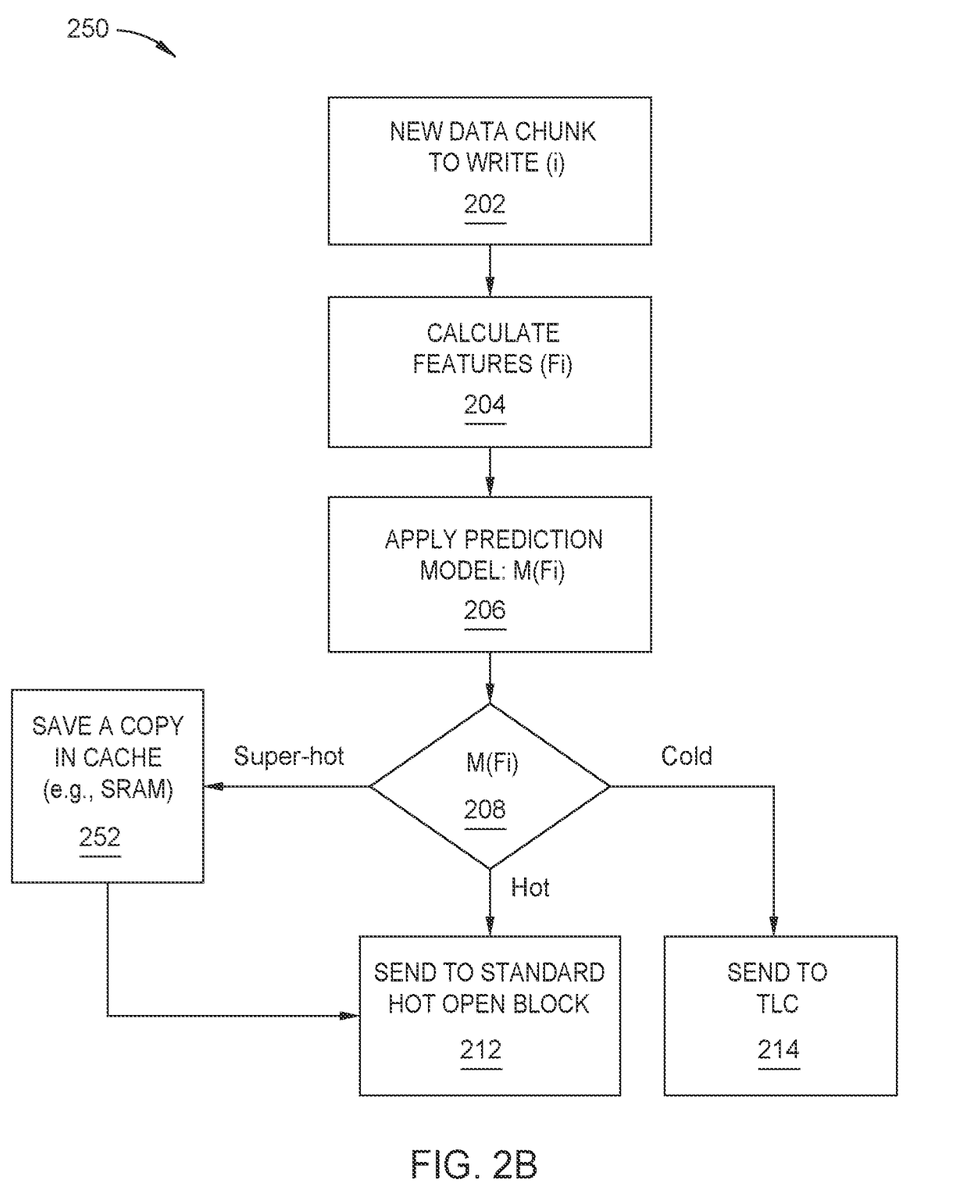
FIG. 2B is a flowchart illustrating super-hot data prediction handling according to one embodiment.

FIG. 2A is a flowchart 200 illustrating super-hot data prediction handling according to one embodiment. FIG. 2B is a flowchart 250 illustrating super-hot data prediction handling according to one embodiment. The method begins by initially received a new chunk of data to write at 202 which is identified as "i". The features of the new chunk of data is calculated at 204 and referred to as "Fi", and the prediction model, referred to as M(Fi) is applied at 206. Based upon the results of the prediction model, a decision is made at 208 regarding where to write the new chunk of data. Cold data is sent to TLC (or MLC or QLC) at 214 while hot data is send to a standard hot open block at 212. Super-hot data can be send to a super-hot open block (i.e., SLC) at 210 as shown in FIG. 2A or saved as a copy in cache (e.g., SRAM) at 252 as shown in FIG. 2B and then sent to the standard hot open block at 212. FIG. 2A represents predictive based open block routing while FIG. 2B represents predictive based caching. In each of FIGS. 2A and 2B, a simple three class prediction model is used (i.e., cold, hot, super-hot), but it is to be understood that more classes are contemplated.

Early prediction of cold data chunks is contemplated. Current hot/cold management approaches are usually based on gradual degradation of un-touched data chunks to cold grading, and as such, for example, pointing out the preferred candidates for eviction. Herein, a "one-shot" approach is proposed for defining the cold chunks immediately during the write time based on the mentioned above prediction model. Stated another way, the new data may be classified immediately as cold data even before being written rather than stored and gradually cool. The proposal will not only reduce the number of mistreatments of cold data as the tagging of data as cold is done immediately, but also will simplify the management of hot/cold data as there will be no need to support the gradual hotness-scoring degradation.

It is also contemplated to perform selective eviction of data from SLC to TLC (or MLC or QLC). The heat score can be used for prioritization of the eviction from SLC to TLC (or MLC or QLC). A first option is a static prioritization according to the heat score defined during the write of each data chunk. A second option is a continuous/dynamic sorting model updating. The second option might include updating of the "heat" score associated with the data based on feedback from later stages according to the data reads after the data programming. In this manner there are two types of evictions: garbage collection which is done as a background operation, or a foreground eviction from SLC to TLC (or MLC or QLC) in case SLC is full.

It is also contemplated to utilize a hot/cold uncertainty prediction that involves including prediction of the uncertainty measure on top of the hard-value mean prediction. The uncertainty is calculated/provided at the time of the writing to give a confidence score for the classification. The more confident in the classification, the easier it is to classify the new data as super-hot or cold rather than simply classifying in the middle at hot. The uncertainty measure can assist to conclude better decisions in either direct routing to SLC/TLC, and/or selective eviction as mentioned above.

It is also contemplated to utilize a hot/cold reliability feedback metric that involves feedback based selective disabling the hot/cold prioritization prediction mechanism. The controller will produce a reliability metric for the hot/cold prediction by tracking actual "hit rate" (either at each point of time, or per neighbor data chunks). The reliability is determined after the write and is used for classifying future data. For example, if old data was misclassified based upon a prediction, then future data with similar metadata may be better classified and even increase the confidence score. The reliability metric will help the system to decide whether to selectively relay on the prediction mechanism, or fallback to reference management method.

It is also contemplated to utilize a prediction based misplaced chunks replacement where misclassified data chunks can be moved, which involves training a different model for selective correction in case of an incorrect prediction (i.e., in case that a data chunk is mistakenly placed in TLC but is actually hot).

It is also contemplated to track the temperature of data at the block level rather than just at the chunk or page or FMU level. Tracking the block temperature reduces the management table overhead. The block temperature is determined upon the open block closure as a function of the individual temperatures of the pages in the block (i.e., average/min/max/etc.).

Figure 3:
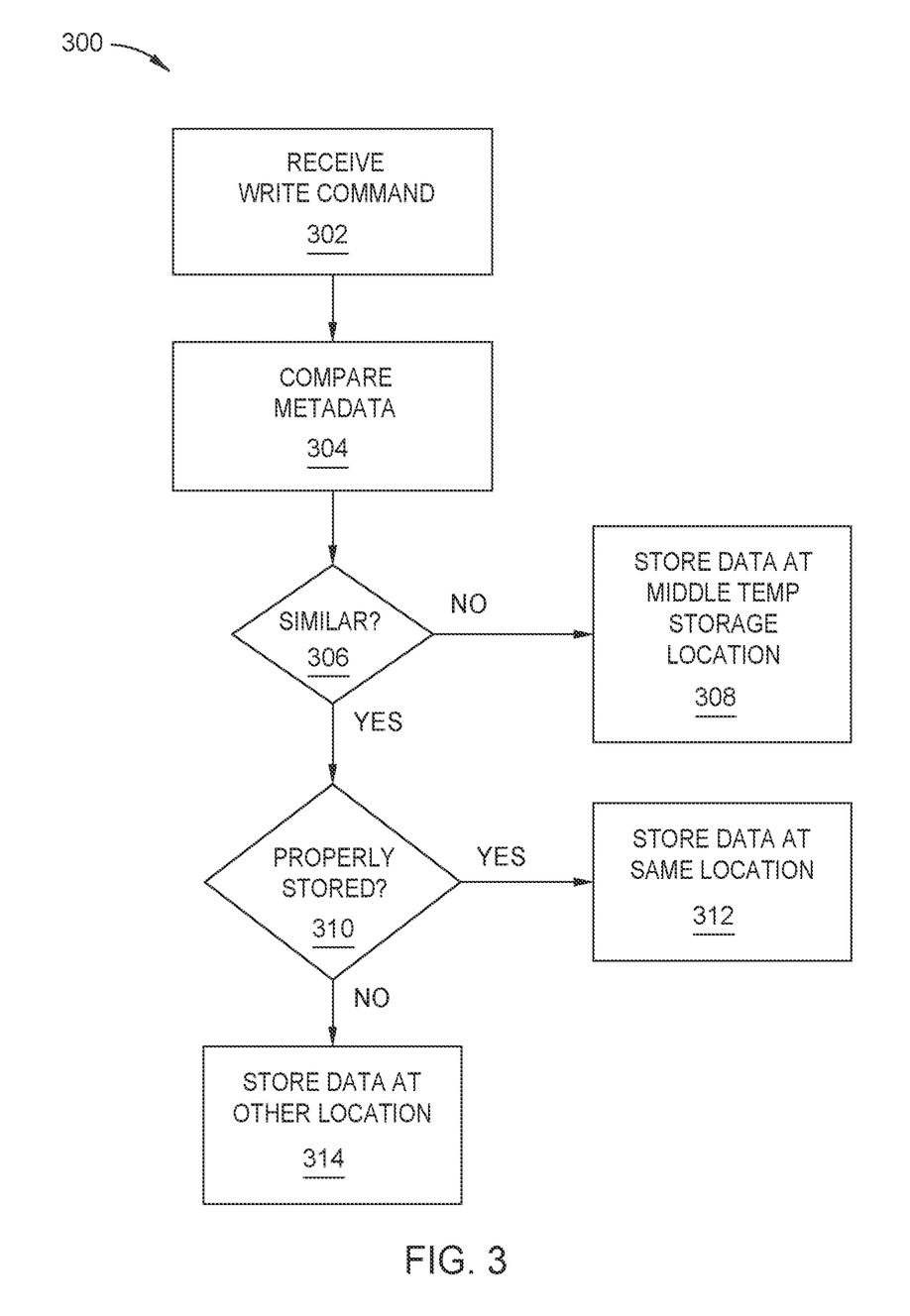
FIG. 3 is a flowchart illustrating routing data based upon predetermined temperature scores.

FIG. 3 is a flowchart 300 illustrating routing data based upon predetermined temperature scores. Initially, a write command is received at 302. The metadata of the data associated with the write command is compared to metadata of already written data at 304. If the metadata is not similar to any metadata of data already stored at 306, then the new data is stored at the middlemost temperature storage location at 308.

If the metadata is similar to metadata of already stored data, then a determination is made regarding whether the data corresponding to the similar metadata is properly classified and hence, stored at 310. If the data corresponding to the metadata is properly classified, then the new data is stored at the same storage location at 312. If the data corresponding to the similar metadata is not properly classified, then the new data is stored at the location where the data corresponding to the similar metadata should be stored at 314.

Figure 4:
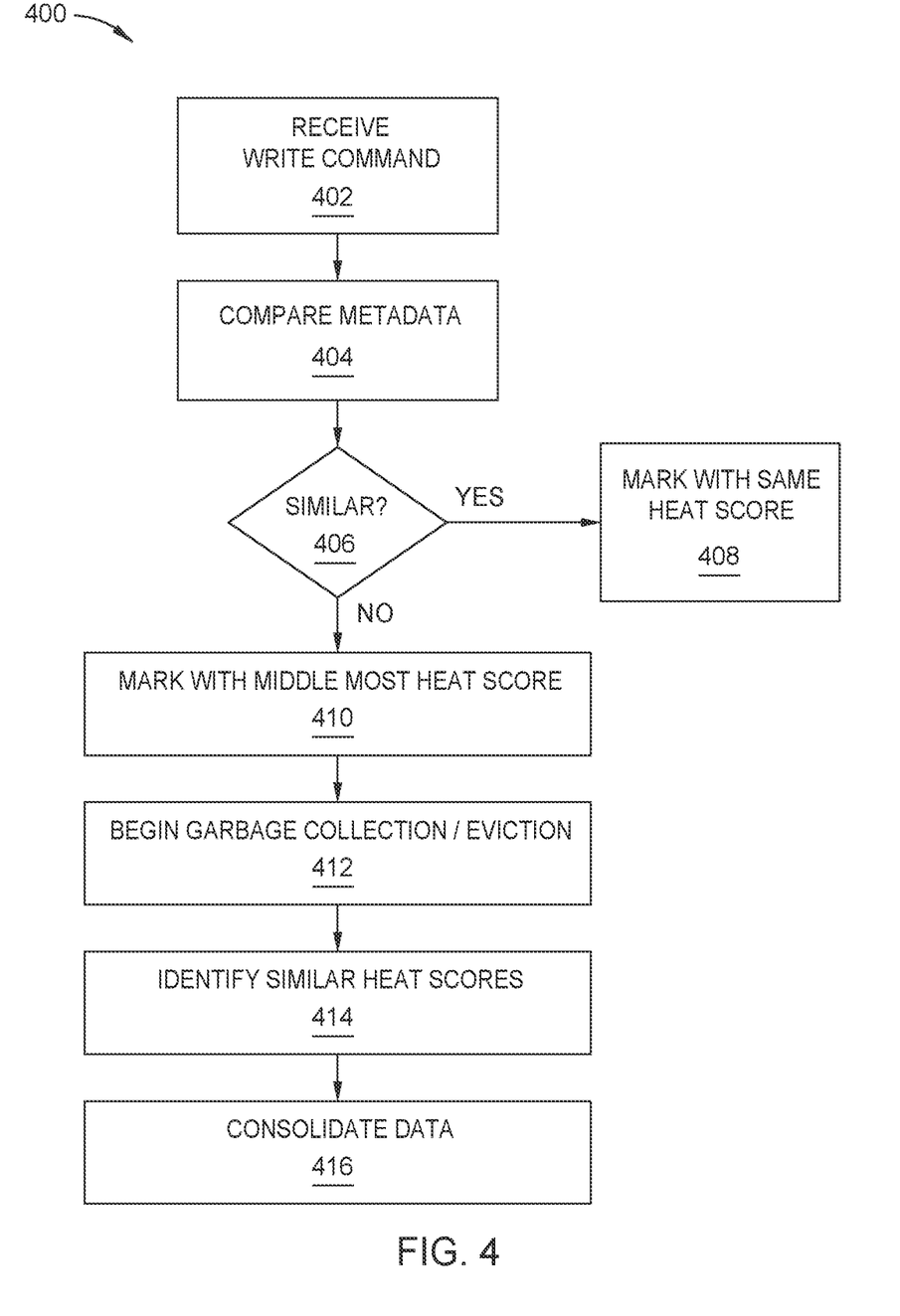
FIG. 4 is a flowchart illustrating evicting data based upon predetermined temperature scores.

FIG. 4 is a flowchart 400 illustrating evicting data based upon predetermined temperature scores. Initially, a write command is received at 402. The metadata of the data associated with the write command is compared to metadata of already written data at 404. If the metadata is similar to any metadata of data already stored at 406, then the new data is marked with the same temperature score at 408 and written to the memory device. If the metadata is not similar at 406, then the new data is given the middlemost temperature score and written to the memory device at 410. At a later point in time, a garbage collection or eviction process begins at 412. Similar heat scores are identified at 414 and data corresponding thereto is consolidated at 416 into a common storage areas.

By using schemes of heat level prediction during writing, along with applications of data routing (cache/SLC/TLC/block type) and eviction priority determination, improved read performance occurs, which increases the SLC reads fraction from ~50% to close to 100%. Additionally or alternatively, the heat level schemes can provide increased endurance by avoiding unnecessary TLC writes of frequently re-written data that is better kept in the SLC partition and by direct writing of cold data to TLC, without wasting unnecessary SLC writes.

The present disclosure generally relates to estimating when data to be written will be read or re-written prior to actually writing the data to the memory device. The estimating can be used to smartly route the data to the appropriate memory location at the writing stage or to evict the data from a hot memory location to a colder memory location. To perform the estimating, typical traces or data may be used as may the metadata of the data.

In one embodiment, a data storage device comprises: a memory device; and a controller coupled to the memory device, wherein the controller is configured to: receive a write command; retrieve data associated with the write command; determine a temperature for the data, wherein the temperature is an indication of how soon the data is to be re-written or read after writing; and write the data to the memory device, wherein the writing occurs after the determining. The temperature is classified as cold, hot, or super-hot, wherein super-hot is expected to be read sooner than hot, and wherein hot is expected to be read sooner than cold. The determining comprises using traces of data previously written to predict how soon the data is to be re-written or read after the writing. In one example, the determining comprises: comparing collected traces of data previously written to traces of the data associated with the write command; and predicting, based upon the comparing, how soon the data is to be re-written or read after the writing. The writing comprises either: writing the data to single level cell (SLC) memory; or writing the data to multi-level cell (MLC) memory. The writing comprises writing the data to volatile memory and also to non-volatile memory. The volatile memory is SRAM and wherein the non-volatile memory is single level cell (SLC) memory. The controller is further configured to store logical to physical (L2P) pointer information corresponding to the data in cache. The data comprises a chunk of data sized to a flash memory unit (FMU), block, or jumbo-block size. The determining comprises measuring features of each data chunk of the data and organizing the data in a regression approach.

In another embodiment, a data storage device comprises: a memory device; and a controller coupled to the memory device, wherein the controller is configured to: retrieve a temperature scores for a plurality of chunks of data stored in single level cell (SLC) memory, wherein the temperature score is created prior to writing the data to SLC; select at least one chunk of data of the plurality of chunks of data; and move the at least one chunk of data from SLC memory to multi-level cell (MLC) memory. The at least one chunk of data has a coldest temperature score compared to remaining chunks of data, wherein the coldest temperature score correlates to an indication that the at least one chunk of data is predicted to be read at a point in time that is later than a point in time that the remaining chunks of data are predicted to be read. The controller is configured to update the temperature score relative to other data chunks after writing the data to SLC. The selecting and moving occur in response to an indication that the SLC memory is full. The controller is configured to disable the selecting based upon feedback indicating reliability of the temperature scores. The controller is further configured to track a temperature score of a block of data, wherein the block of data contains chunks of data and wherein at least one chunk of data has a different temperature score compared to another chunk of data. The controller is further configured to selectively move a chunk of data from MLC memory to SLC memory, wherein the moved chunk of data had an incorrect temperature score. The temperature score is an estimate of when the data will be read or re-written.

In another embodiment, a data storage device comprises: memory means; and a controller coupled to the memory means, wherein the controller is configured to: determine an estimate of when data will be read or re-written prior to writing the data to the memory means; write the data to a location in the memory means based upon the determining; and perform a garbage collection operation to move data within the memory means based upon the determining. The estimate is based upon metadata of the data. The determining comprises determining an uncertainty measure for the estimate and, based upon the uncertainty measure, take an action, wherein the action is writing data to a particular location.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device, wherein the memory device is non-volatile memory; and
a controller coupled to the memory device, wherein the controller is configured to:
receive a write command;
retrieve data associated with the write command;
determine a temperature for the data, wherein the temperature is an indication of how soon the data is to be re-written or read after writing, wherein determining the temperature comprises comparing metadata of the data to metadata of already written data to find similarities therebetween, wherein a metadata comparison provides a prediction of where to store the data such that similar metadata is to be stored in a same location;
write the data to the memory device, wherein the writing occurs after the determining and to a location of the memory device based upon the comparing;
store logical to physical (L2P) pointer information corresponding to the data in cache, wherein the cache is volatile memory distinct from the memory device;
receive another write command;
retrieve data associated with the another write command;
determine a temperature for the data associated with the another write command;
write the data associated with the another write command to the cache; and
store L2P pointer information corresponding to the data associated with the another write command in the cache.

2. The data storage device of claim 1, wherein the temperature is classified as cold, hot, or super-hot, wherein super-hot is expected to be read sooner than hot, and wherein hot is expected to be read sooner than cold.

3. The data storage device of claim 1, wherein the determining comprises:
using traces of data previously written to predict how soon the data is to be re-written or read after the writing.

4. The data storage device of claim 1, wherein the writing comprises either:
writing the data to single level cell (SLC) memory; or
writing the data to multi-level cell (MLC) memory.

5. The data storage device of claim 1, wherein the writing comprises writing the data to volatile memory and also to non-volatile memory.

6. The data storage device of claim 5, wherein the volatile memory is SRAM and wherein the non-volatile memory is single level cell (SLC) memory.

7. The data storage device of claim 1, wherein the data comprises a chunk of data sized to a flash memory unit (FMU), block, or jumbo-block size.

8. The data storage device of claim 1, wherein the determining comprises measuring features of each data chunk of the data and organizing the data in a regression approach.

* * * * *